Oct. 17, 1933.  L. A. M. PHELAN  1,931,238
ELECTRICAL SWITCH
Filed Dec. 22, 1926
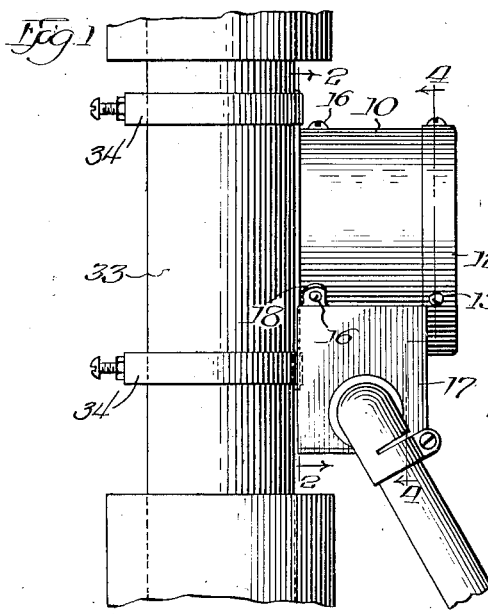
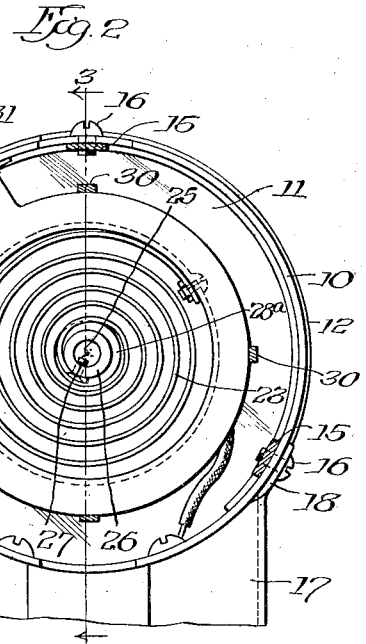
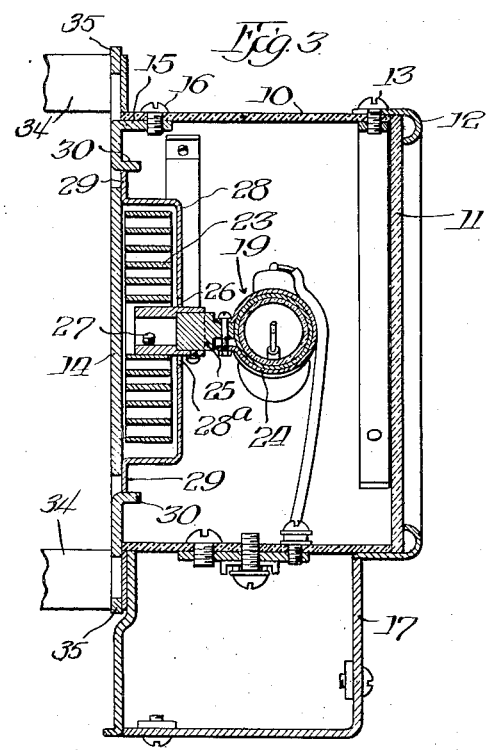
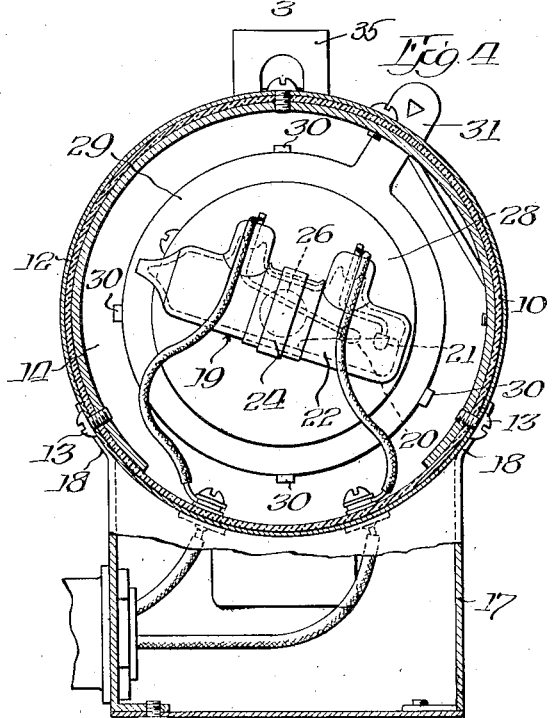
Inventor:
Louis A. M. Phelan Patented Oct. 17, 1933

1,931,238

UNITED STATES PATENT OFFICE

1,931,238

ELECTRICAL SWITCH

Louis A. M. Phelan, Elkhart, Ind., assignor, by mesne assignments, to Minneapolis-Honeywell Regulator Company, Minneapolis, Minn., a corporation of Delaware Application December 22, 1926
Serial No. 156,345

18 Claims. (Cl. 200—139)

This invention relates to an electric switch and has special reference to an electric switch actuated by a heat responsive element.

More particularly this invention relates to an electric switch actuated by a heat responsive element and having means whereby a substantially horizontal or minimum heat gradient is established between a radiant point and said heat responsive element.

The term "radiant point" as used herein may be defined as the point from which rays of heat proceed and is the object or thing to which the electric switch is applied. Also, the term "heat gradient" as used herein may be defined as the rate at which the heat changes in value, and therefore, a minimum heat gradient between a radiant point and a heat responsive element may be interpreted as a minimum dissipation of heat between the heat responsive element of an electric switch and the object to which said switch is applied.

This invention will be hereinafter described in association with a heating system wherein said device is applied to the exterior of a hot riser of a hot water plant. In this connection the device utilizes the temperature lag between the riser upon which the device is installed and the hot water tank.

To be more explicit, it may be assumed that the device is used for controlling a burner in a heating system and is installed on the hot riser leading from a boiler to a hot water tank. When the burner is in operation, the hot riser is hotter than the hot water tank. When the burner is idle, the hot riser is cooler than the hot water tank. This temperature lag has the effect of sensitizing the thermal unit in the device thus causing an actuation thereof for controlling the burner so that the temperature of the hot water tank is practically invariable.

In order to control the burner efficiently so that the temperature of the water in the hot water tank is practically constant, it is necessary that substantially the entire aforementioned temperature lag be recorded by the thermal unit for actuating the controlling means and, therefore, this invention has particular reference to an electrical switch having means for minimizing the amount of heat lost in the transmission thereof from the riser upon which said switch is mounted to the thermal unit within said switch. Other objects will be apparent from the description and drawing forming a part of this specification to which reference may now be had for a more complete understanding of the characteristic features of this invention, in which drawing:

Figure 1 is a side elevational view of the device as installed on a hot riser;

Fig. 2 is a rear sectional view taken on the line 2—2 of Fig. 1;

Fig. 3 is a sectional view taken on the line 3—3 of Fig. 2; and

Fig. 4 is a front sectional view taken on the line 4—4 of Fig. 1.

Referring more particularly to the drawing, wherein this invention is illustrated, the device will be hereinafter described as provided with a thermostatic coil having a liquid or mercury contactor switch mounted thereon, the energy expended by the coil at a predetermined temperature varying the position of said switch in such manner as to open or close the circuit therein. It is to be understood, however, that any type of heat responsive element may be used that will provide an actuating force for an electric switching mechanism for opening and closing the electric circuit as the thermostat or heat responsive element expands and contracts by reason of temperature changes that may influence it.

The electric switch comprises a shell or casing 10, preferably of an insulating material, having a glass wall 11 mounted on the face side of said casing, said glass being held in position by a rim 12 suitably secured to the shell 10 as by means of screws 13. The rear of said shell 10 is enclosed by means of a metal plate 14 having a plurality of lugs 15, preferably integral therewith, and extending into said shell to be secured thereto by means of screws 16. An outlet box 17, provided with lugs 18, is attached to the shell 10 by means of screws 16 extending through said lugs 18 and shell 10 and into said lugs 15.

The switching mechanism may preferably comprise a cylindrical and elongated tube 19 made of glass and serving to house a pair of electrodes or contact-making members 20 and 21, said latter members being located at one end of said tube and adapted to be bridged by a body of electrical current-conducting fluid, such as mercury 22, which fluid is likewise disposed in said tube. It will be apparent from the drawings that if the tube 19 should be tilted in the proper direction, the body of mercury 22 will flow toward the electrodes 20 and 21, thus bridging the electrodes and placing them in electrical contacting relation with each other. This tube 19, housing the aforementioned elements, will hereinafter be referred to as a mercury or liquid contactor.

The tube 19 is mounted on the inner end of a spiral thermostatic element 23 by means of a detachable band 24, which latter is suitably secured to a stud 25 adjustably mounted in a collar 26, said collar being secured to said inner end of said element 23 by suitable means such as a screw 27. The spiral element 23 is supported in turn by means of its outer end being secured to a cap or housing 28 by a screw or other suitable means, said cap having an aperture 28a through which the collar 26 extends.

As it is desirable to have the device close the circuit at various temperatures, the cap 28 is rotatably mounted on the plate 14 by means of the flange 29 engaging a plurality of lugs 30 extending from plate 14 and disposed around the periphery of said flange 29. A regulating arm 31, preferably integral with said flange, extends from the flange and through an elongated slot 32, said arm acting to adjust the angular position of the switching mechanism and also serving to hold the cap in its position against the wall 14. In my novel device it may also be advantageous to provide any suitable additional means on the shell 10 and engaging the cap 28 for urging the cap against the wall 14, but in order to avoid confusion of the various parts, such means are not shown and form no part of my invention.

In order to regulate the switching mechanism so that it will close the circuit at various temperatures, the regulating arm 31 is moved in the proper direction toward the desired position, whereafter the spiral element is rotated by thermal conditions and changed to circuit closing or opening position as the case may be. For example, if it is desired to have the device close the circuit at a temperature of 70° instead of 65°, the regulating arm 31 is adjusted so that the angular position of the contactor tube is changed whereby the energy induced by the expansion of the coil at 70° will be sufficient to continue the rotation of the tube 19 to circuit closing position.

The switch is mounted on the hot riser or pipe 33, preferably by means of two metal bands 34 engaging ears 35, which latter extend from plate 14. In this manner, the metal plate 14 is held in a contacting relation with the pipe 33 which causes the former to be heated. Inasmuch as the flange 29 of the cap 28 has a substantial contact with the plate 14, heat is thereby transmitted to said flange from plate 14 and thence throughout the entire surface of the cap. As a result of this transmission of heat throughout the plate 14 and the cap 28, the thermostatic element 23, which is disposed between the plate and cap, receives an even distribution of heat on all sides thereof. It is essential, of course, that the plate 14 and cap 28 are of a character having a high heat conductivity, such for instance as aluminum.

In order to enhance the thermal conductivity to the bimetallic element or thermostatic element 23, it may be desirable to dispose a semi-liquid material in the cap 28 to surround the coils of the element 23. The substance of this semi-liquid material may be of cosmoline or petroleum jelly, which, besides being good thermal conductors, also act to keep the moving parts of the instrument waterproofed and free from moisture. It is preferable that this body of petroleum jelly or other substance should have a point of solidification lower than that to any temperature to which the instrument may be subjected so as to minimize the friction in the operation of the element 23.

It will be readily apparent that the aforementioned structure provides means whereby the loss of heat, which is radiated from the pipe 33 to effect the thermal unit 23, is practically negligible, and moreover, that substantially the entire heat radiation is transmitted to all sides of the thermal unit, thereby providing as practical and efficient a structure as though the thermal unit were immersed in the heating content itself.

It is to be understood, however, that the thermal unit shown in the drawing is merely for illustrative purposes, and that it may be desirable to provide a conical or helical spiral element instead of the simple spiral shown in this device. Furthermore, a simple coil element, or any heat responsive element, may be used as the actuating element, it being necessary only to redesign the cap 28 to conform to the contour of the element thus used. It is also to be understood that the device is not to be limited to the switching mechanism herein described, since any switching mechanism which may be controlled by a thermal unit may be readily employed, however, many advantages reside in a mercury contactor tube.

As a result of this invention, there exists a substantially horizontal heat gradient between the radiant point and the thermal unit, and while a single embodiment of this invention is herein shown and described, it is to be understood, nevertheless, that this invention is not to be limited to that particular structure since various modifications will be apparent to one skilled in the art without departing from the spirit and scope of this invention, and therefore, this invention is to be limited only by the scope of the appended claims and the prior art.

I claim:

1. An electrical device comprising a heat conducting plate of relatively high thermal conductivity for contact with a radiant point, a heat conducting housing of relatively high thermal conductivity rotatably mounted on said plate, a flange on said housing for making a substantial surface contact with said plate, thermal responsive means disposed within said housing and adjacent said plate whereby a minimum of heat gradient is established between a radiant point and said thermal responsive means, one end of said thermal means being fixed to said housing, and an electrical switch mounted on the opposite end of said thermal responsive means, and an arm extending from said flange for rotating said housing to adjust the angular position of said switch.

2. A thermally actuated electric switch comprising a heat conducting plate adapted to contact with a heat radiant point, a thermal responsive element disposed adjacent to said plate, an adjustable heat conducting casing enclosing said thermal responsive element and in close thermal relation to said heat conducting plate, an electrical switching means exterior of said casing, and means connecting said switching means and said thermal responsive element whereby the former may respond to the thermal conditions of the latter, said switching means being adjustable in unison with said casing.

3. A thermally actuated electric switch comprising a heat conducting plate adapted to contact with a heat radiant point, a thermal responsive element disposed adjacent to said plate, a heat conducting casing enclosing said thermal responsive element and in close thermal relation to said heat conducting plate and adjustable relatively thereto, a mercury contactor switch exterior of said casing, and means connecting said contactor switch with said thermal responsive element whereby operation of the former is controlled in accordance with the thermal conditions of the latter.

4. A thermally actuated electric switch comprising a heat conducting plate adapted to contact with a heat radiant point, a heat responsive element disposed adjacent thereto, a heat conducting casing enclosing said heat responsive element and in close thermal relation to said plate but adjustable relatively thereto, said heat responsive element being secured to said casing so as to move in unison therewith, electrical switching means exterior of said casing, and means connecting said switching means and said thermal responsive element whereby the former may be controlled by the latter.

5. A thermally actuated electric switch comprising a heat conducting plate adapted to contact with a heat radiant point, a bimetallic element disposed in close proximity to said plate, a heat conducting casing enclosing said bimetallic element and disposed in close thermal relation to said plate but adjustable relatively thereto, said bimetallic element being secured to said casing so as to move in unison therewith, electrical switching means exterior of said casing and spaced therefrom a substantial distance, and means connecting said switching means and said thermal responsive element whereby the operation of the former may be controlled by the latter.

6. A thermally actuated electric switch comprising a heat conducting plate adapted to contact with a heat radiant point, a heat responsive element disposed in close thermal relation to said plate, a heat conducting casing enclosing said heat responsive element and disposed in close thermal relation to said plate and said element, an electric switching means exterior of said heat conducting casing, means connecting said switching means and said heat responsive element whereby the operation of the former may be controlled by the latter, a housing enclosing said switching means, said heat conducting casing and said heat responsive element, and means accessible exteriorly of said housing for adjusting the position of said heat responsive element and switching means.

7. A thermally actuated electric switch comprising a heat conducting plate adapted to contact with a heat radiant point, a coiled bimetallic element disposed in close thermal relation to said plate, a heat conducting casing enclosing said bimetallic element and in close thermal relation thereto and to said plate, said casing being adjustable relatively to said plate and said bimetallic element having one end secured to said casing so as to move in unison therewith, an electrical switching means exterior of said casing, and means connecting said switching means and the other end of said thermal responsive element.

8. A thermally actuated electric switch comprising a heat conducting plate adapted to contact with a heat radiant point, a coiled bimetallic element disposed in close thermal relation to said plate, a heat conducting casing enclosing said bimetallic element and in close thermal relation thereto and to said plate, said casing being adjustable relatively to said plate and said bimetallic element having one end secured to said casing so as to move in unison therewith, a mercury contactor exterior of said casing, and means connecting said mercury contactor and the other end of said bimetallic element.

9. A thermally actuated electric switch comprising switching means, thermal responsive means for operating said switching means, a heat conducting plate of relatively high conductivity for contact with a radiant point and adapted to be attached thereto, and a heat conducting housing of relatively high thermal conductivity having a flange on said housing for making a substantial surface contact with said plate whereby a close thermal relation is established between said housing and said plate, said thermal means being disposed within said housing and adjacent said plate whereby a minimum of heat gradient exists between said radiant point and said thermal responsive means and said switching means being disposed exteriorly of said housing.

10. An electrical device comprising a heat conducting plate of relatively high thermal conductivity for contact with a radiant point, a heat conducting housing of relatively high thermal conductivity movable relatively to said plate, a flange associated with said housing for making substantial surface contact with said plate, thermal responsive means disposed within said housing and positioned adjacent to said plate whereby a minimum of heat gradient is established between the radiant point and said thermal responsive means, one end of said thermal means being fixed to said housing, an electrical contactor wholly and tiltably supported upon the other end of said thermal responsive means, and an arm extending from said housing for adjusting the tilting angle of said contactor.

11. An electrical device comprising a heat conducting plate for contact with a radiant point, a thermal responsive element positioned adjacent to said plate, a heat conducting housing movable relatively to said plate and enclosing said heat responsive element, a flange associated with said housing for making substantial surface contact with said plate, said housing and said plate establishing a minimum heat gradient between the radiant point and said thermal responsive means, said thermal responsive means being fixed to said housing, electric switching means exterior of said housing and actuated by said thermal responsive means, and means for adjusting said housing to control the operation of said switching means.

12. In a thermostat, a casing, a thermal element whose position varies with change of temperature carried by said casing, an oscillatable mercury switch carried and controlled by said thermal element, and means for mounting said casing for movement to shift the position of the thermal element to vary the relation of the mercury to the switch contacts.

13. In a thermostat, a casing, a thermal element whose position varies with change of temperature carried by said casing, an oscillatable mercury switch carried and controlled by said thermal element, and means for mounting said casing for movement to shift the position of the thermal element to vary the relation of the mercury to the switch contacts, said mercury switch being outside said casing.

14. In a thermostat, a casing, a thermal element whose position varies with change of temperature carried by said casing, an oscillatable mercury switch carried and controlled by said thermal element, means for mounting said casing for movement to shift the position of the thermal element to vary the relation of the mercury to the switch contacts, said mercury switch being outside said casing, a housing for said casing and mercury switch, and means operable from the outside of the housing for moving said casing.

15. A thermally actuated electric switch comprising a heat conducting plate adapted to contact with a heat radiant point, a heat responsive element disposed in close thermal relation to said plate, a casing cooperating with said plate to closely confine said heat responsive element, a mercury contactor switch exterior of said casing, means connecting said contactor switch with said heat responsive element whereby operation of the former is controlled in accordance with the thermal conditions of the latter, a housing enclosing said mercury contactor switch, and means for adjusting the temperature at which the mercury contactor switch is operated by the heat responsive element, said means being operable without removing said housing.

16. A thermally actuated electric switch comprising a plate adapted to contact with a heat radiant point, a thermal responsive element disposed adjacent to said plate, an adjustable casing enclosing said thermal responsive element and in close thermal relation to said plate, an electrical switching means exterior of said casing, and means connecting said switching means and said thermal responsive element whereby the former may respond to the thermal conditions of the latter, said switching means being adjustable in unison with said casing.

17. A thermally actuated electric switch comprising a heat conducting member adapted to contact with a heat radiant point, a heat responsive element disposed in close thermal relation to said member, a casing cooperating with said heat conducting member to closely confine said heat responsive element, switching mechanism exteriorly of said casing, means connecting said switching mechanism with said heat responsive element whereby operation of the former is controlled in accordance with the thermal conditions of the latter, a housing enclosing said switching mechanism, and means for adjusting the temperature at which the switching mechanism is operated by the heat responsive element, said means being operable without removing said housing.

18. In a thermostatically operated electric switch structure, the combination with a base plate constituting a mounting for the switch structure, of a thermal element, a heat conducting housing for said thermal element which is adjustably mounted upon said base plate, the said thermal element being in close thermal relation to said base plate and said housing, means for securing one end of said thermal element directly to said housing whereby heat is allowed to be conducted directly from said base plate to said thermal element through said heat conducting housing, an electric circuit breaker, means connecting said thermal element and said circuit breaker, and means accessible exteriorly of said heat conducting housing for adjusting in unison the position of the said housing upon said base plate and the position of said thermal element relative to said base plate whereby the operation of said electric circuit breaker is rendered adjustable.

LOUIS A. M. PHELAN.